(12) United States Patent
Gonze et al.

(10) Patent No.: US 9,410,458 B2
(45) Date of Patent: Aug. 9, 2016

(54) STATE OF CHARGE CATALYST HEATING STRATEGY

(75) Inventors: Eugene V. Gonze, Pinckney, MI (US); Halim G. Santoso, Novi, MI (US); Brian Spohn, Holly, MI (US); Bryan Nathaniel Roos, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 582 days.

(21) Appl. No.: 12/571,729

(22) Filed: Oct. 1, 2009

(65) Prior Publication Data

US 2011/0078999 A1 Apr. 7, 2011

(51) Int. Cl.
| | |
|---|---|
| *F01N 3/00* | (2006.01) |
| *F01N 3/10* | (2006.01) |
| *B60K 6/20* | (2007.10) |
| *F01N 3/20* | (2006.01) |
| *F01N 9/00* | (2006.01) |

(52) U.S. Cl.
CPC ............... *F01N 3/2026* (2013.01); *F01N 9/00* (2013.01); *F01N 2900/08* (2013.01); *F01N 2900/104* (2013.01); *F01N 2900/1602* (2013.01); *Y02T 10/26* (2013.01); *Y02T 10/47* (2013.01)

(58) Field of Classification Search
CPC .... F01N 9/00; F01N 3/2026; F01N 2900/104
USPC ................. 60/284, 286, 303, 300; 180/65.21; 477/3
IPC ................................................ F01N 3/20, 9/00
See application file for complete search history.

(56) References Cited

U.S. PATENT DOCUMENTS

| | | | | |
|---|---|---|---|---|
| 3,577,164 | A | | 5/1971 | Re Baratelli et al. |
| 4,221,205 | A | | 9/1980 | Koehler |
| 5,163,290 | A | * | 11/1992 | Kinnear .......................... 60/274 |
| 5,224,335 | A | * | 7/1993 | Yoshizaki ........................ 60/300 |
| 5,234,668 | A | | 8/1993 | Harada et al. |
| 5,257,501 | A | * | 11/1993 | Wataya ............................ 60/284 |
| 5,345,761 | A | | 9/1994 | King et al. |
| 5,465,573 | A | | 11/1995 | Abe et al. |
| 5,537,321 | A | | 7/1996 | Yoshizaki et al. |
| 5,566,774 | A | | 10/1996 | Yoshida |
| 5,588,291 | A | * | 12/1996 | Maus et al. ...................... 60/274 |
| 5,689,952 | A | | 11/1997 | Kato et al. |
| 5,713,198 | A | | 2/1998 | Aoki et al. |
| 5,785,137 | A | | 7/1998 | Reuyl |

(Continued)

FOREIGN PATENT DOCUMENTS

| | | |
|---|---|---|
| DE | 4100133 A1 | 7/1992 |
| DE | 4231711 A1 | 4/1993 |

(Continued)

OTHER PUBLICATIONS

English machine translation of JP 10-228028A.*

(Continued)

*Primary Examiner* — Kenneth Bomberg
*Assistant Examiner* — Jason Sheppard

(57) ABSTRACT

A control system includes a state of charge module and a control module. The state of charge module receives a parameter associated with a battery in a vehicle and determines a state of charge of the battery based on the parameter. The control module activates a heater in a catalytic converter in an exhaust system of the vehicle based on the state of charge.

21 Claims, 3 Drawing Sheets

(56) References Cited

U.S. PATENT DOCUMENTS

| | | |
|---|---|---|
| 5,785,138 A | 7/1998 | Yoshida |
| 5,791,140 A | 8/1998 | Shimasaki et al. |
| 5,857,325 A * | 1/1999 | Shimasaki et al. ............... 60/284 |
| 5,950,419 A | 9/1999 | Nishimura et al. |
| 5,966,931 A * | 10/1999 | Yoshizaki et al. ............... 60/284 |
| 6,057,605 A | 5/2000 | Bourne et al. |
| 6,122,910 A | 9/2000 | Hoshi et al. |
| 6,131,538 A | 10/2000 | Kanai |
| 6,151,890 A | 11/2000 | Hoshi |
| 6,167,696 B1 | 1/2001 | Maaseidvaag et al. |
| 6,189,316 B1 | 2/2001 | Surnilla et al. |
| 6,209,672 B1 | 4/2001 | Severinsky |
| 6,244,043 B1 | 6/2001 | Farmer et al. |
| 6,324,835 B1 | 12/2001 | Surnilla et al. |
| 6,394,209 B1 | 5/2002 | Goehring et al. |
| 6,532,926 B1 | 3/2003 | Kuroda et al. |
| 6,543,219 B1 | 4/2003 | Surnilla |
| 6,557,505 B1 | 5/2003 | Hori |
| 6,585,940 B2 | 7/2003 | Abe et al. |
| 6,651,422 B1 | 11/2003 | LeGare |
| 6,735,937 B2 | 5/2004 | Sumilla et al. |
| 6,799,421 B2 | 10/2004 | Surnilla |
| 6,820,471 B2 | 11/2004 | Ito |
| 6,853,895 B2 | 2/2005 | Javaherian |
| 6,895,744 B2 | 5/2005 | Osawa |
| 7,077,224 B2 | 7/2006 | Tomatsuri et al. |
| 7,213,665 B2 | 5/2007 | Yamaguchi et al. |
| 7,363,915 B2 | 4/2008 | Surnilla et al. |
| 7,603,227 B2 | 10/2009 | Watanabe et al. |
| 7,707,821 B1 | 5/2010 | Legare |
| 7,792,627 B1 | 9/2010 | Santoso et al. |
| 7,829,048 B1 | 11/2010 | Gonze et al. |
| 7,934,487 B2 | 5/2011 | Santoso et al. |
| 8,209,970 B2 | 7/2012 | Gonze et al. |
| 8,359,844 B2 | 1/2013 | Gonze et al. |
| 8,413,423 B2 | 4/2013 | Roos et al. |
| 2003/0172643 A1 * | 9/2003 | Suzuki ............................ 60/284 |
| 2004/0045753 A1 | 3/2004 | Yamaguchi et al. |
| 2004/0111199 A1 * | 6/2004 | Javaherian ....................... 701/36 |
| 2006/0278449 A1 | 12/2006 | Torre-Bueno |
| 2007/0186876 A1 | 8/2007 | Elwart et al. |
| 2008/0099259 A1 | 5/2008 | Tomo |
| 2008/0133114 A1 * | 6/2008 | Okubo et al. .................. 701/108 |
| 2008/0282673 A1 | 11/2008 | Gonze et al. |
| 2009/0025371 A1 | 1/2009 | Hermansson et al. |
| 2010/0192122 A1 | 7/2010 | Esfahan et al. |
| 2010/0205939 A1 | 8/2010 | Sano et al. |
| 2010/0212981 A1 | 8/2010 | Roos et al. |
| 2011/0047980 A1 | 3/2011 | Santoso et al. |

FOREIGN PATENT DOCUMENTS

| | | |
|---|---|---|
| DE | 60307939 T2 | 9/2007 |
| EP | 0935056 A2 | 8/1999 |
| JP | 09158715 | 6/1997 |
| JP | 10288028 A * | 10/1998 |
| JP | 2003227366 A | 8/2003 |
| WO | WO-2007107135 A1 | 9/2007 |

OTHER PUBLICATIONS

Office Action dated Mar. 30, 2012 from the German Patent Office for German Patent Application No. 10 2010 035 480.5; 6 pages.

* cited by examiner

STATE OF CHARGE CATALYST HEATING STRATEGY

FIELD

The present invention relates to electrically heated catalyst control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine combusts a mixture of air and fuel that produces drive torque and exhaust gas. The exhaust gas may contain emissions including nitrogen oxides (NOx), carbon monoxide (CO), and hydrocarbons (HC). An exhaust treatment system converts the emissions to carbon dioxide and water using a catalytic converter.

The catalytic converter includes a catalyst that stores oxygen and HC. The catalyst becomes active when the catalyst temperature is greater than or equal to an activation temperature. While the catalyst temperature is less than the activation temperature, the emissions may exit the exhaust system. The catalyst temperature may be increased by raising the temperature of the exhaust gas.

The engine may increase the exhaust gas temperature using various methods. For example, the engine may increase fueling and decrease spark advance to increase HC entering the catalyst. The HC may combust in the catalyst and raise the catalyst temperature. Increasing fueling and decreasing spark advance may result in higher HC emissions, decreased fuel economy, and unpleasant fuel odors.

SUMMARY

A control system includes a state of charge module and a control module. The state of charge module receives a parameter associated with a battery in a vehicle and determines a state of charge of the battery based on the parameter. The control module activates a heater in a catalytic converter in an exhaust system of the vehicle based on the state of charge.

A method includes receiving a parameter associated with a battery in a vehicle, determining a state of charge of the battery based on the parameter, and activating a heater in a catalytic converter in an exhaust system of the vehicle based on the state of charge.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
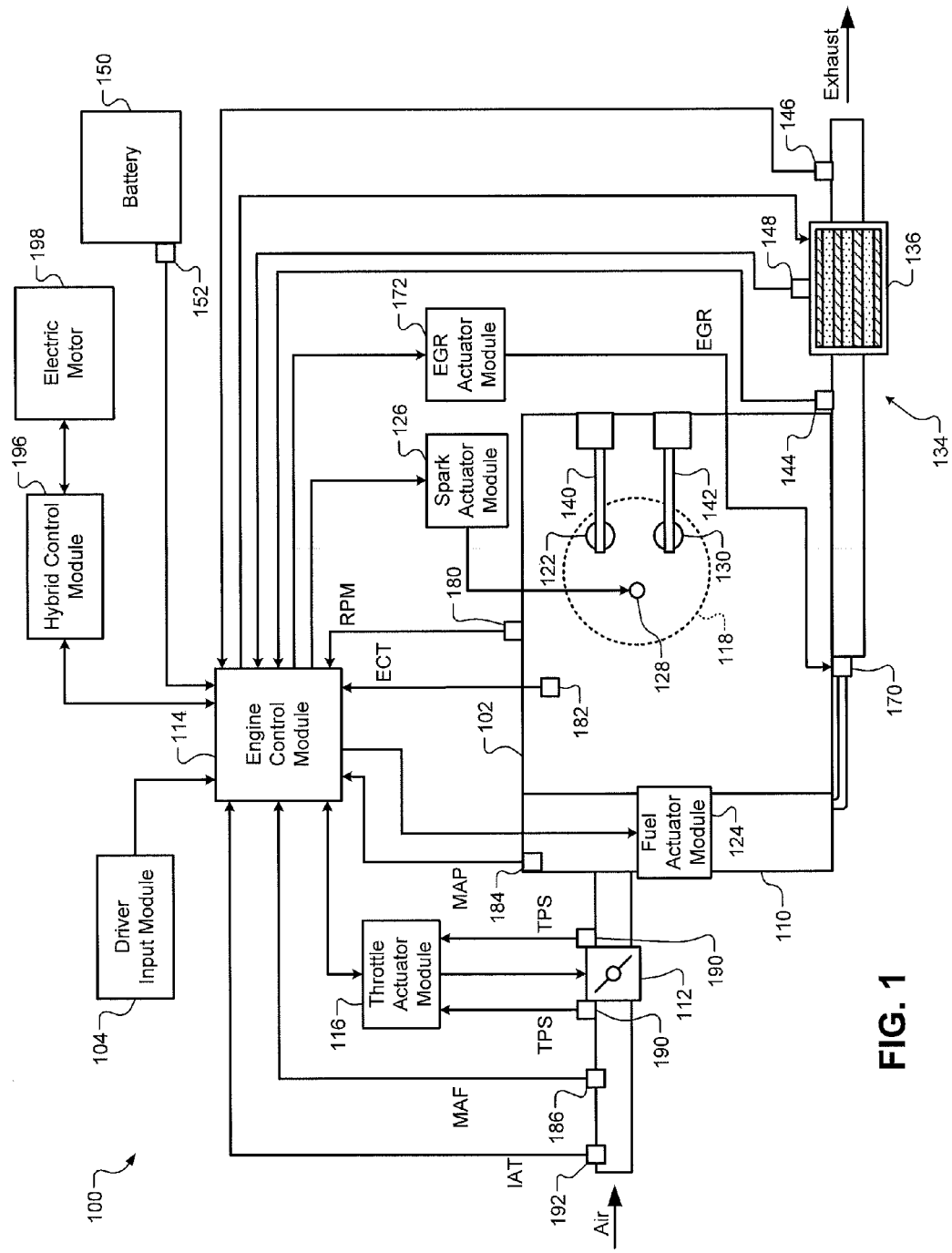
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Electrically heated catalyst control techniques of the present disclosure determine a state of charge of a battery in a vehicle and activate an electrically heated catalyst based on the state of charge. The electrically heated catalyst may be activated when the state of charge decreases below a state of charge threshold. The state of charge threshold may be determined such that sufficient power is available to increase a catalyst temperature to an activation temperature via the electrically heated catalyst before an engine is started.

Activating the electrically heated catalyst to increase the catalyst temperature to the activation temperature before the engine is started reduces exhaust emissions. Increasing the catalyst temperature via the electrically heated catalyst rather than the engine and/or an EGR decreases HC emissions, improves fuel economy, and decreases unpleasant fuel odors.

Referring now to FIG. 1, a functional block diagram of an exemplary engine system 100 is presented. The engine system 100 includes an engine 102 that combusts an air/fuel mixture to produce drive torque based on a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, a single representative cylinder 118 is shown for illustration purposes. For example only, the engine 102 may include 2, 3, 4, 5, 6, 8, 10, and/or 12 cylinders.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134. The exhaust system may include an electrically heated catalyst or catalytic converter 136. The ECM 114 may provide a signal to the converter 136 to energize a heater in the converter 136, thereby increasing a catalyst temperature.

A timing signal that indicates how far before or after TDC to provide the spark may control the spark actuator module 126. Accordingly, operation of the spark actuator module 126 may be synchronized with crankshaft rotation. In various implementations, the spark actuator module 126 may halt provision of spark to deactivated cylinders.

An intake camshaft 140 may control the intake valve 122, while an exhaust camshaft 142 may control the exhaust valve 130. In various implementations, multiple intake camshafts may control multiple intake valves per cylinder and/or control the intake valves of multiple banks of cylinders. Similarly, multiple exhaust camshafts may control multiple exhaust valves per cylinder and/or control exhaust valves for multiple banks of cylinders.

Exhaust gas exits the engine 102 through the exhaust valve 130 and enters the exhaust system 134. An oxygen sensor 144 may measure an oxygen concentration of the exhaust gas before the exhaust gas enters the converter 136. A second oxygen sensor 146 may measure the oxygen concentration of the exhaust gas after the exhaust gas exits the converter 136. A catalyst temperature sensor 148 may measure a catalyst temperature at the converter 136. Other temperature sensors (not shown) may measure exhaust gas temperatures at positions similar to and between the positions of the oxygen sensors 144 and 146. The ECM 114 may model the exhaust gas temperatures based on predetermined tables.

A battery 150 supplies power to components of the engine system 100. A state of charge (SOC) sensor 152 generates a signal indicating a state of charge of the battery 150 (e.g., percentage of power remaining in the battery 150). The SOC sensor 152 may include multiple sensors. The ECM 114 determines the state of charge of the battery 150 based on the signal received from the SOC sensor 152. The ECM 114 may activate the heater in the converter 136 when the state of charge is less than a state of charge threshold.

The engine system 100 may include an exhaust gas recirculation (EGR) valve 170. The EGR valve 170 selectively redirects exhaust gas back to the intake manifold 110. The EGR valve 170 may be controlled by an EGR actuator module 172.

The engine system 100 may measure the speed of the crankshaft in revolutions per minute (RPM) using an RPM sensor 180. The temperature of the engine coolant, which indicates the temperature of the engine 102, may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a hybrid control module 196 to coordinate operation of the engine 102 and an electric motor 198. For example, the ECM 114 may operate only the electric motor 198 when the state of charge of the battery 150 is greater than a state of charge threshold. When the state of charge is less than or equal to the state of charge threshold, the ECM 114 may operate the engine 102.

The electric motor 198 may also function as a generator, and may be used to produce electrical energy for use by vehicle electrical systems and/or for storage in a battery. In various implementations, functions of the ECM 114 and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the EGR actuator module 172 and the fuel actuator module 124. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

Figure 2:
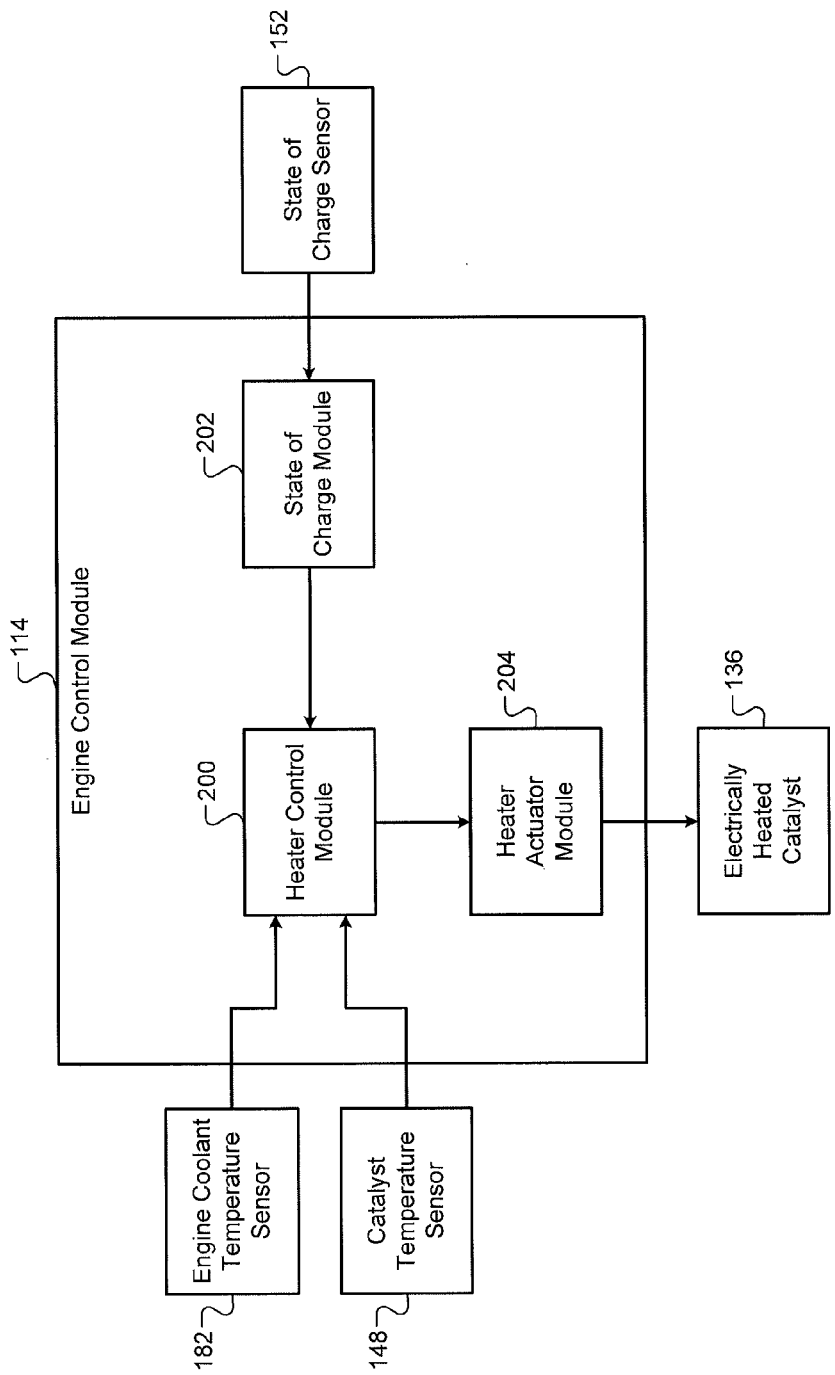
FIG. 2 is a functional block diagram of the engine control module of FIG. 1 according to the principles of the present disclosure.

Referring now to FIG. 2, the ECM 114 includes a heater control module 200, a state of charge (SOC) module 202, and a heater actuator module 204. In various implementations, functions of the heater control module 200, the SOC module 202, and the heater actuator module 204 may be integrated into one or more modules.

The SOC sensor 152 measures one or more parameters that may include a current supplied by the battery 150, a voltage supplied by the battery 150, a temperature of the battery 150, an internal pressure of the battery 150, a specific gravity of an electrolyte in the battery 150, and/or a pH of the electrolyte. The SOC module 202 receives a signal from the SOC sensor 152 indicating the measured parameters. The SOC module 202 determines a battery state of charge based on the measured parameters and/or a battery capacity.

For example only, the SOC sensor 152 may measure the current supplied by the battery 150 in amperes. The battery capacity may be predetermined in amperes-hours and stored in the SOC module 202. The SOC module 202 may determine the battery state of charge based on the current supplied by the battery 150 and the battery capacity.

More specifically, the SOC module 202 may determine a product of the current and a period corresponding to the current. The SOC module 202 may determine a remaining capacity by subtracting the product of the current and the period from the battery capacity. The SOC module 202 may determine the battery state of charge by calculating a percentage obtained by dividing the remaining capacity by the battery capacity.

In another example, the SOC sensor 152 may measure the voltage supplied by the battery 150. The SOC module 202 may determine the battery state of charge based on the voltage using a predetermined relationship between the battery state of charge and the voltage. In addition, the SOC sensor 152 may measure the current supplied by the battery 150 and the temperature of the battery 150. The predetermined relationship between the battery state of charge and the voltage may vary based on the current and the temperature.

In another example, the SOC sensor 152 may measure the internal pressure of the battery 150 and/or the pH. The SOC module 202 may determine the battery state of charge based on the pressure using a predetermined relationship between the battery state of charge and the pressure. The SOC module 202 may determine that the battery state of charge is 100% when the internal pressure is greater than a pressure threshold.

In another example, the SOC sensor 152 may measure the specific gravity of the electrolyte in the battery 150 and/or the pH of the electrolyte in the battery 150. The SOC module 202 may determine the battery state of charge based on the specific gravity using a predetermined relationship between the battery state of charge and the specific gravity. The SOC module 202 may determine the battery state of charge based on the pH using a predetermined relationship between the battery state of charge and the pH.

The SOC module 202 may employ more than one of the methods described above to determine the battery state of charge. The heater control module 200 receives the catalyst temperature from the catalyst temperature sensor 148, the battery state of charge from the SOC module 202, and the engine coolant temperature from the ECT sensor 182.

The heater control module 200 controls the converter 136 via the heater actuator module 204 based on the catalyst temperature, the battery state of charge, and the engine coolant temperature. The heater control module 200 generates a signal to activate the heater in the converter 136 when the battery state of charge is less than a state of charge threshold. The heater actuator module 204 activates the heater in the converter 136 based on the signal received from the heater control module 200.

The state of charge threshold may be determined such that sufficient power is available to increase the catalyst temperature to an activation temperature before the engine 102 is started. The state of charge threshold may also be determined such that sufficient power is available to maintain the catalyst temperature at the activation temperature until the engine coolant temperature rises to an operating temperature.

The engine 102 may be started when the battery state of charge is less than a second state of charge threshold. The second state of charge threshold may be determined such that the battery state of charge does not decrease to zero due to operating the electric motor 198 but not the engine 102. The heater control module 200 may vary power supplied to the heater in the converter 136 based on the catalyst temperature.

The heater control module 200 may control the converter 136 based on a heated volume of the converter 136 and a warm-up rate of the engine 102. The state of charge threshold may be determined based on the heated volume of the converter 136 and a warm-up rate of the engine 102. The heated volume of the converter 136 and the warm-up rate of the engine 102 may be predetermined. The state of charge threshold may be directly related to the heated volume of the converter 136. The state of charge threshold may be inversely related to the warm-up rate of the engine 102.

Figure 3:
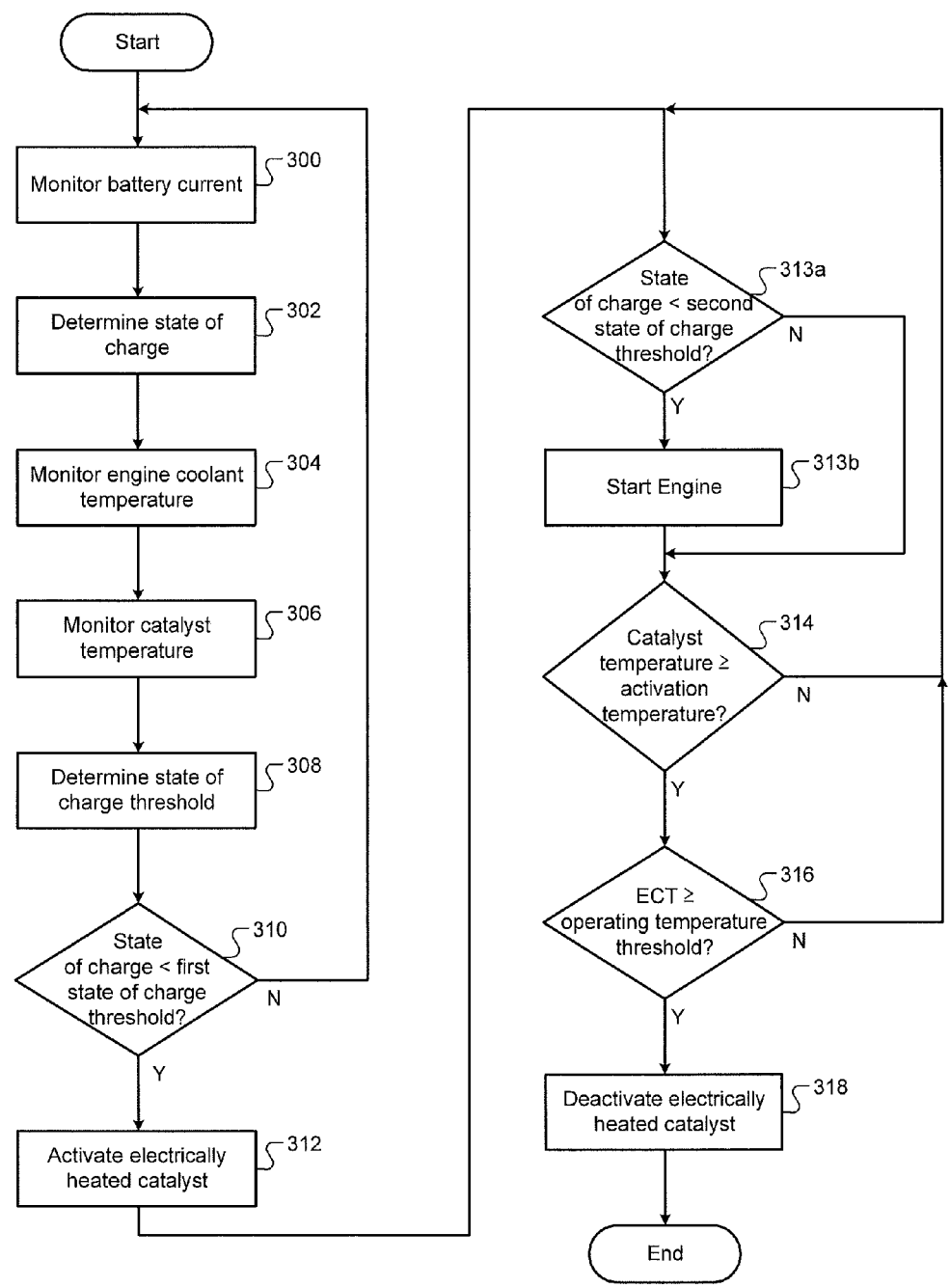
FIG. 3 illustrates steps performed in an exemplary electrically heated catalyst control method according to the present disclosure.

Referring now to FIG. 3, steps performed in an exemplary electrically heated catalyst control method are illustrated. In steps 300, control monitors a battery current. In step 302, control determines a battery state of charge based on the battery current and a predetermined battery capacity.

Control monitors an engine coolant temperature and a catalyst temperature in steps 304 and 306, respectively. In step 308, control determines a first state of charge threshold based on the engine coolant temperature and/or the catalyst temperature. Control may also determine the first state of charge threshold based on an engine warm-up rate and/or a catalyst volume.

Control may determine the first state of charge threshold such that the catalyst temperature is greater than or equal to an activation temperature when an engine is started. Control may start the engine when the battery state of charge is less than a second state of charge threshold. Control may determine the second state of charge threshold such that operating a vehicle using only an electric motor does not decrease the battery state of charge to zero percent.

For example only, control may determine that the first state of charge threshold is high when the catalyst temperature is low and the catalyst volume is high, indicating a high amount of power is required to raise the catalyst temperature to the activation temperature. Conversely, control may determine that the first state of charge threshold is low when the catalyst temperature is high and the catalyst volume is low, indicating a low amount of power is required to raise the catalyst temperature to the activation temperature.

In step 310, control determines whether the battery state of charge is less than the first state of charge threshold. When the battery state of charge is greater than or equal to the first state of charge threshold, control returns to step 300. When the battery state of charge is less than the first state of charge threshold, control activates an electrically heated catalyst in step 312. In step 313*a*, control determines whether the battery state of charge is less than the second state of charge threshold. When the battery state of charge is greater than or equal to the first state of charge threshold, control proceeds directly to step 314. When the battery state of charge is less than the second state of charge threshold, control starts the engine in step 313*b* and then proceeds to step 314.

Control may vary a power supplied to the electrically heated catalyst based on the catalyst temperature. For example, when the electrically heated catalyst is initially activated and the catalyst temperature is low, control may maximize the power. As the electrically heated catalyst warms-up and the catalyst temperature starts to increase, control may decrease the power.

Control may also vary a power supplied to the electrically heated catalyst based on the engine coolant temperature. For example, when the engine is initially started and the engine coolant temperature is low, control may maximize the power. As the engine warms-up and the engine coolant temperature starts to increase, control may decrease the power.

In step 314, control determines whether the catalyst temperature is greater than or equal to an activation temperature. When the catalyst temperature is less than the activation temperature, control returns to step 313*a*. When the catalyst temperature is greater than or equal to the activation temperature, control proceeds to step 316.

In step 316, control determines whether the engine coolant temperature is greater than or equal to an operating temperature threshold. When the engine coolant temperature is less than the operating temperature threshold, control returns to step 313a. When the engine coolant temperature is greater than or equal to an operating temperature threshold, control deactivates the electrically heated catalyst in step 318.

Control may determine the first state of charge threshold such that sufficient power is available to operate the electrically heated catalyst until the engine coolant temperature is greater than the operating temperature threshold. Control may determine that the first state of charge threshold is high when the engine coolant temperature is low and the engine warm-up rate is low, indicating a high amount of power is required to maintain the catalyst temperature at or above the activation temperature. Conversely, control may determine that the first state of charge threshold is low when the engine coolant temperature is high and the engine warm-up rate is high, indicating a low amount of power is required to maintain the catalyst temperature at or above the activation temperature.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine system, comprising:
   a heater for heating a catalytic converter in an exhaust system of a vehicle;
   a first electronic circuit configured to receive a parameter associated with a battery in said vehicle and determines a state of charge of said battery based on said parameter; and
   a second electronic circuit configured to:
   activate said heater when said state of charge is less than a first state of charge threshold; and
   determine said first state of charge threshold based on a volume of said catalytic converter and a measured temperature of an engine in said vehicle, wherein said measured temperature is measured during operation of said vehicle when said engine is off and an electric motor in said vehicle is being used to produce drive torque; and
   a third electronic circuit configured to start said engine when said state of charge is less than a second state of charge threshold and said measured temperature of said engine is less than an operating temperature, wherein said second electronic circuit determines at least one of said first and second state of charge thresholds such that sufficient power is available to increase a temperature of said catalytic converter to an activation temperature using said heater and to continue to activate said heater while said measured temperature of said engine is less than said operating temperature.

2. The engine system of claim 1 wherein said parameter includes at least one of a current supplied by said battery, a voltage supplied by said battery, a temperature of said battery, a capacity of said battery, a pressure in said battery, a specific gravity of an electrolyte in said battery, and a pH of said electrolyte.

3. The engine system of claim 1 wherein said second electronic circuit is configured to determine said first state of charge threshold further based on a temperature of said catalytic converter.

4. The engine system of claim 3 wherein said second electronic circuit is configured to determine said first state of charge threshold such that said temperature of said catalytic converter is greater than or equal to an activation temperature when said engine is started.

5. The engine system of claim 1 wherein said second electronic circuit is configured to determine said first state of charge threshold further based on a warm-up rate of said engine.

6. The engine system of claim 1 wherein said second electronic circuit is configured to:
   continue to activate said heater after said engine is started while said measured temperature of said engine is less than said operating temperature; and
   deactivate said heater after said engine is started when said measured temperature of said engine is greater than or equal to said operating temperature.

7. The engine system of claim 1 wherein said second electronic circuit is configured to vary a power supplied to said heater based on a temperature of said catalytic converter.

8. The engine system of claim 1 wherein said second state of charge threshold is determined such that said state of charge does not decrease to zero.

9. The engine system of claim 1 wherein said second electronic circuit is configured to vary power supplied to said heater while said heater is activated.

10. The engine system of claim 1 wherein said first and second electronic circuits include at least one of an Application Specific Integrated Circuit (ASIC), a processor and memory, and a combinational logic circuit.

11. A method, comprising:
    receiving a parameter associated with a battery in a vehicle and determining a state of charge of said battery based on said parameter;
    determining a first state of charge threshold based on a volume of a catalytic converter in an exhaust system of said vehicle and a measured temperature of an engine in said vehicle, wherein said measured temperature is measured during operation of said vehicle when said engine is off and an electric motor in said vehicle is being used to produce drive torque;
    activating a heater in said catalytic converter and thereby heating said catalytic converter when said state of charge is less than said first state of charge threshold;
    starting said engine when said state of charge is less than a second state of charge threshold and said measured temperature of said engine is less than an operating temperature; and
    determining at least one of said first and second state of charge thresholds such that sufficient power is available to increase a temperature of said catalytic converter to an activation temperature using said heater and to continue to activate said heater while said measured temperature of said engine is less than said operating temperature.

12. The method of claim 11 wherein said parameter includes at least one of a current supplied by said battery, a voltage supplied by said battery, a temperature of said battery, a capacity of said battery, a pressure in said battery, a specific gravity of an electrolyte in said battery, and a pH of said electrolyte.

13. The method of claim 11 further comprising determining said first state of charge threshold further based on a temperature of said catalytic converter.

14. The method of claim 13 further comprising determining said first state of charge threshold such that said temperature of said catalytic converter is greater than or equal to an activation temperature when said engine is started.

15. The method of claim 11 further comprising determining said first state of charge threshold further based on a warm-up rate of said engine.

16. The method of claim 11 further comprising:
continuing to activate said heater after said engine is started while said measured temperature of said engine is less than said operating temperature; and
deactivating said heater after said engine is started when said measured temperature of said engine is greater than or equal to said operating temperature.

17. The method of claim 16 further comprising starting said engine when said state of charge is less than a second state of charge threshold and said measured temperature of said engine is less than said operating temperature.

18. The method of claim 11 further comprising varying a power supplied to said heater based on a temperature of said catalytic converter.

19. The method of claim 11 further comprising determining said second state of charge threshold such that said state of charge does not decrease to zero.

20. The method of claim 11 further comprising varying power supplied to said heater while said heater is activated.

21. The method of claim 11 further comprising:
continuing to activate said heater after said engine is started while said measured temperature of said engine is less than said operating temperature; and
deactivating said heater after said engine is started when said measured temperature of said engine is greater than or equal to said operating temperature.

* * * * *